US006443187B1

(12) United States Patent
Wang et al.

(10) Patent No.: US 6,443,187 B1
(45) Date of Patent: Sep. 3, 2002

(54) ALIGNING WOVEN LOOP ELEMENTS TO FORM MOUNTING SLEEVES

(75) Inventors: Der-Shi Wang; Pamela C. Wang, both of Bedford; David E. Godlewski, Goffstown, all of NH (US)

(73) Assignee: Velcro Industries B.V., Curacao (AN)

( * ) Notice: Subject to any disclaimer, the term of this patent is extended or adjusted under 35 U.S.C. 154(b) by 0 days.

(21) Appl. No.: 09/570,072

(22) Filed: May 12, 2000

Related U.S. Application Data

(63) Continuation-in-part of application No. 09/456,281, filed on Dec. 7, 1999, which is a continuation-in-part of application No. 09/050,501, filed on Mar. 30, 1998, now Pat. No. 5,996,189.

(51) Int. Cl.[7] ........................ A44B 13/00; A44B 18/00
(52) U.S. Cl. .......................................... 139/391; 24/445
(58) Field of Search .............................. 139/391; 24/445

(56) References Cited

U.S. PATENT DOCUMENTS 2,717,437 A    9/1955   DeMestral (List continued on next page.)

FOREIGN PATENT DOCUMENTS

| CA | 0977532      | 11/1975 |
| DE | 198 55 211 A1 | 11/1998 |
| EP | 0 106 771 A1 | 4/1984  |
| EP | 0 581 570 A2 | 7/1992  |
| EP | 0 682 888 A1 | 11/1995 |
| GB | 1 270 604    | 4/1972  |
| JP | 5-154009     | 6/1993  |
| WO | WO 93/12687  | 7/1993  |
| WO | WO99/49750   | 10/1999 |

OTHER PUBLICATIONS

International Search Report mailed Oct. 31, 2001 for International Appln. No. PCT/US00/42570 (8 pages).

*Primary Examiner*—Andy Falik
(74) *Attorney, Agent, or Firm*—Fish & Richardson P.C.

(57) ABSTRACT

A woven fastener product is shown in which monofilament loops woven in the structure are shown sized and located to provide pin-receiving mounting sleeves as part of the woven structure to fasten a device or object to the woven structure. In one case, a pair of sleeves has a pre-determined spacing corresponding to the spacing between a pair of mounting pins of a pre-determined device such as a wrist watch. In another case, an extensive field of mounting sleeves formed by a series of adjacent, parallel rows of the sleeves enable the mounting on the same band of different devices having different mounting pin spacings, e.g., to enable different size watches to be used on the same type of band. The mounting loops lying between those that correspond with the particular mounted device provide a cushioning effect adding to comfort and secure positioning of the watch or other device on the band. Particular woven fastener bands are shown which include an array of hook elements and an array of loop elements that extend from the surface of different respective regions of a common fabric base. The hook arrays are formed by warp yarns, the array of hooks and the array of mounting-sleeve defining loops being separated in the warp direction of the fabric base. To form a self-engaged fastening, the fastener product is conformed so that the hook elements overlie multifilament loop elements, extensions of the multifilament loop elements forming part of the fabric base the loop elements.

6 Claims, 9 Drawing Sheets

U.S. PATENT DOCUMENTS

| | | |
|---|---|---|
| 3,261,069 A | 7/1966 | Marhison |
| 3,319,307 A | 5/1967 | Marforio |
| 3,387,345 A * | 6/1968 | Savoir .................. 139/391 |
| 3,405,430 A | 10/1968 | Sidelman |
| 3,426,363 A | 2/1969 | Girard |
| 3,469,289 A | 9/1969 | Whitacre |
| 3,555,630 A | 1/1971 | Wylde |
| 3,594,873 A * | 7/1971 | Hockmeyer ............... 24/204 |
| 4,646,397 A | 3/1987 | Yoshida |
| 4,654,246 A * | 3/1987 | Provost et al. ............ 428/88 |
| 4,818,580 A | 4/1989 | Bottger et al. |
| 4,999,067 A | 3/1991 | Erb et al. |
| 5,081,748 A | 1/1992 | Eberle |
| 5,136,759 A | 8/1992 | Armour, II |
| 5,169,709 A | 12/1992 | Fleischer |
| 5,231,738 A | 8/1993 | Higashinaka |
| 5,349,991 A * | 9/1994 | Okawa et al. ............. 139/391 |
| 5,369,852 A | 12/1994 | Higashinaka |
| 5,369,853 A | 12/1994 | Okawa et al. |
| 5,399,481 A | 3/1995 | Hartmanns et al. |
| 5,436,051 A | 7/1995 | Donaruma et al. |
| 5,457,855 A | 10/1995 | Kenney et al. |
| 5,492,133 A | 2/1996 | McVicker |
| 5,515,583 A | 5/1996 | Higashinaka |
| 5,659,930 A * | 8/1997 | Okawa ...................... 24/445 |
| 5,669,120 A | 9/1997 | Wessels et al. |
| 5,686,163 A | 11/1997 | Tsubata et al. |
| 5,996,189 A * | 12/1999 | Wang ........................ 24/451 |

* cited by examiner

ALIGNING WOVEN LOOP ELEMENTS TO FORM MOUNTING SLEEVES

This application is a continuation-in-part of U.S. application Ser. No. 09/456,281, filed Dec. 7, 1999 file date Mar. 30, 1998, which is a continuation-in-part of U.S. application Ser. No. 09/050,501, now issued as U.S. Pat. No. 5,996,189, the entire contents of each of which are hereby incorporated by reference as if fully set forth herein.

BACKGROUND

The invention generally relates to woven fastener products for use in hook-and-loop fastening, to bands for supporting or connecting to devices, such as bands for wrist watches and the like, and to methods of their manufacture.

Woven fastener products include a fabric base from which an array of tiny fastener elements extend. The fastener elements are manufactured by projecting loops of yarns from the fabric base during the weaving process. Loops of multifilament yarns can function as female fastening elements. In other cases, loops of monofilament yarns can be cut and/or heated, after weaving, to produce male fastener elements having, for example, hook or mushroom shapes.

To form a closure, male fastener elements engage overlying female fastener elements. Certain fastener products have arrays that include both male and female fastener elements and thus can self-engage.

SUMMARY

According to an important aspect of the invention a woven fastener product is provided including a fabric base having ground yarns comprising warp yarns and filling yarns extending respectively in warp and filling directions, the woven fastener product having a functional region comprising woven loops that form pin-receiving sleeves for fastening a device or watch to the fastener product.

Preferred embodiments of this aspect of the invention have one or more of the following features.

The woven fastener product has monofilament warp yarns, at least some of the monofilament warp yarns in one region forming loops that cooperate to form a mounting sleeve for a device to be attached to the fastener product, preferably at least some of the monofilaments warp yarns in another region spaced in the warp direction from the first region forming an array of hooks for hook and loop fastening.

The woven fastener product has at least some of the same monofilaments that, in one region, form hooks, in another region form at least part of a pin-receiving mounting sleeve.

The woven fastener product has spaced apart, parallel pin-receiving sleeves that are spaced to receive mounting pins on opposite sides of a device to be mounted to the product.

The woven fastener product, for use with a pre-determined device, has parallel mounting pins at a pre-determined spacing, there being spaced apart pin-receiving sleeves in the fastener product that correspond to the pre-determined spacing.

The woven fastener product has a field of pin-receiving sleeves, pairs of these rows at different spacings being suitable to receive mounting pins of different devices having correspondingly different spacings.

The woven fastener product is combined with a wrist watch body having mounting pins on opposite sides of the body inserted through respective sleeves on the woven fastener product.

The woven fastener product has second and third functional regions that have respective fastener element arrays that include a plurality of rows of fastener elements, the fastener elements comprising yarns of the fabric base that project from a surface of the fabric base in respective selected locations, the second functional region including a plurality of rows of loop-engaging fastener elements, the third functional region including a plurality of rows of loop fastener elements. In preferred embodiments, the loop fastener elements comprise multi-filament yarns projecting from the fabric base at selected locations, the multi-filament yarns extending across the warp direction of the woven fastener product and functioning as ground yarns of the fabric base in a region free of loop fastener elements, preferably a region free of loop fastener elements comprises the second functional region. Preferably the fabric base includes a first fabric layer and at least a second fabric layer, the multi-filament yarns extending between and holding together the first fabric layer and the second fabric layer in the region free of loop fastener elements. The fabric base may also include a third fabric layer.

According to another aspect of the invention, there is provided a method of manufacturing a woven fastener product including a fabric base having ground yarns comprising warp yarns and filling yarns extending respectively in warp and filling directions, comprising in at least one selected functional region forming at least some of the yarns into loops that cooperate to define pin-receiving mounting sleeves.

Preferred embodiments of this aspect of the invention have one or more of the following features.

The yarns employed in the method are monofilaments.

The woven fastener product, in the warp direction, has a second functional region separated from the first functional region, the second functional region having an array including a plurality of rows of fastener elements, the fastener elements extending from a surface of the fabric base, the method comprising: projecting monofilament yearns of the fabric base from the surface of the fabric base in selected locations in the first functional region to form an array of loops that cooperate to define pin-receiving mounting sleeves; projecting monofilament yarns of the fabric base from the surface of the fabric base in selected locations in the second functional region; and cutting the monofilament yarns projecting from the surface of the fabric base in the second functional region to form an array of loop-engaging fastener element.

According to another aspect of the invention, there is provided a method of manufacturing a woven fastener product including weaving warp monofilaments in a base, and at selected regions, forming at least some of the monofilaments in loops that are subsequently acted upon to form hooks, and in at least one other region of the fastener product forming at least some of the monofilaments into loops that cooperate to define pin-receiving mounting sleeves.

Preferred embodiments of these various methods have one or more of the following features.

For use with a pre-determined device having mounting pins spaced a pre-determined distance, the method includes forming mounting sleeves into the product spaced apart that distance, to receive the pins of the device.

The method includes forming a field of rows of said mounting sleeves suitable to receive mounting pins of a range of devices having respectively different spacing between pins.

According to another aspect of the invention a woven fastener product is provided that includes an array of male fastener elements and an array of female fastener elements extending from a common fabric base and separated in the warp direction.

In another aspect of the invention, a woven fastener product is featured that includes a fabric base having ground yarns including warp yarns and filling yarns that extend respectively in warp and filling directions. The woven fastener product, in the warp direction, has separate functional regions. The functional regions have respective fastener element arrays that include a plurality of rows of fastener elements. The fastener elements are yarns of the fabric base that project from a surface of the fabric base in selected locations. A first functional region includes a plurality of rows of loop-engaging fastener elements and is substantially free of loop fastener elements. A second functional region includes a plurality of rows of loop fastener elements and is substantially free of loop-engaging fastener elements.

Embodiments of this principle may include one or more of the following features.

The loop fastener elements are multi-filament yarns that extend across the warp direction of the woven fastener product, project from the fabric base at selected locations in the second functional region, and function as ground yarns of the fabric base in a region free of loop fastener elements. Preferred embodiments of this feature include one or more of the following. The region free of loop fastener elements is the first functional region. The fabric base includes a first fabric layer and a second fabric layer. The multi-filament yarns extend between and hold together the first fabric layer and the second fabric layer in the region free of loop fastener elements.

The loop-engaging fastener elements are monofilament yarns that project from the fabric base at selected locations in the first functional region, the monofilament yarns extend in a warp direction of the product and function as ground yarns of the fabric base in a region free of loop-engaging fastener elements. Preferred embodiments of this feature include one or more of the following. The region free of loop-engaging fastener elements is the second functional region. The fabric base includes a first fabric layer and a second fabric layer. The monofilament yarns extend between and hold together the first fabric layer and the second fabric layer in the region free of loop-engaging fastener elements.

The first functional region and the second functional region are separated in the warp direction by a region free of fastener elements. A preferred embodiment of this feature is that the region free of fastener elements includes multi-filament ground yarns that form loop-engaging fastener elements in the first functional region and monofilament ground yarns that form loop fastener elements in the second functional region.

The functional regions extend in the filling direction substantially across the width of the fastener product. The rows of fastener elements extend in the filling direction. The rows of fastener elements include more than two fastener elements. The fastener element arrays include more than two rows of fastener elements. The base fabric is a webbing having a thickness of at least 0.030 inches and a tensile strength in the warp direction of the webbing of at least 300 pound per lineal inch of width of the webbing. The loop-engaging fastener elements are hook elements.

The sides of the fastener product extending in the warp direction include integral edge portions that are enlarged, in cross-section, relative to a main body of the fabric base to serve as load-dissipating structures. A preferred embodiment of this feature is that the edge portions are woven tube structures.

At least some of the ground yarns are activated adhesive yarns that anchor the fastener elements to the woven base. Preferred embodiments of this feature include one or more of the following. The activated adhesive yarns are comprised of a heat-activatable substance. The activated adhesive yarns are comprised of a solvent-activatable substance.

The woven fastener product is in the form of a watch band. Preferred embodiments include one or more of the following. The watch band includes a region free of fastener elements adjacent one of the functional regions. The region free of fastener elements is suitable for attaching a timepiece thereto. A first end of the watch band is attached to a buckle. The buckle is constructed such that an opposite end of the watch band extends there through. The watch band is bent around the buckle to overlay the first functional region with the second functional region.

In another general aspect of the invention, a method of manufacturing a woven fastener product is featured. The woven fastener product includes a fabric base having ground yarns including warp yarns and filling yarns extending respectively in warp and filling directions. The woven fastener product, in the warp direction, has a first functional region separated from a second functional region. The functional regions have respective fastener element arrays that include a plurality of rows of fastener elements, the fastener elements extending from a surface of the fabric base. The method includes the following steps: projecting multi-filament yarns of the fabric base from the surface of the fabric base in selected locations in the second functional region to form an array of loop elements; projecting monofilament yarns of the fabric base from the surface of the fabric base in selected locations in the first functional region; and cutting the monofilament yarns projecting from the surface of the fabric base in the first functional region to form an array of loop-engaging elements being substantially free of loop elements.

Among other advantages, the woven fastener product provides separate regions of hook and loop elements that extend from a common fabric base making the product particularly suitable for applications, such as watch bands and sandal straps, that self-engage.

Both the hook and loop regions are integrally formed with the fabric base. Thus, it is not necessary to separately attach individual hook fastener strips and loop fastener strips to a common fabric. This eliminates an expensive and difficult operation (e.g. sewing) and can improve the appearance and performance of the final product. For example, puckering is avoided, that can often occur in the sewing process, due to differential shrinkage of the separate components. Puckering can mar the appearance and sometimes compromises the function of the final product.

In some cases, the common fabric base is a webbing having strength suitable for use in load bearing applications. Additionally, the edges of the fastener products can be made relatively soft to the touch, thus making the product desirable for applications involving frequent handling or direct contact with flesh. Furthermore, the fabric base may have a flexible and/or soft texture because fastener elements are anchored without coating the backside of the product with a binder material which imparts roughness and stiffness to the base.

In advantageous embodiments, monofilament loop rows are sized and positioned to define pin-receiving sleeves for mounting a device such as a watch by use of customary mounting pins of the body of the device.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 8b is a plan view of the assembly of FIG. 8a;

FIG. 9 is a view similar to FIG. 8 of an embodiment of a woven fastener wrist band incorporating a large field of woven pin-receiving sleeves that can receive mounting pins of watches over a range of watch sizes, while

DETAILED DESCRIPTION

Referring to FIGS. 1–5, a woven fastener product 2 includes an array of hook elements 4 and an array of loop elements 6 that project from different respective regions 5, 7 of a woven fabric base 8. The hook element region 5 and the loop element region 7 are separated in the warp direction, axis 10, of the fabric base 8 by a region 12 free of fastener elements. As described further below, the hook and loop elements are formed from yarns of the fabric base 8 that project from a surface of the fabric base in selected locations. The fastener product 2, in use, is self-engageable by bending the fabric base 8 such that the hook elements overlie the loop elements. Secure closures can be formed by aligning the hook and loop arrays to engage a large percentage of the fastener elements.

Figure 1:
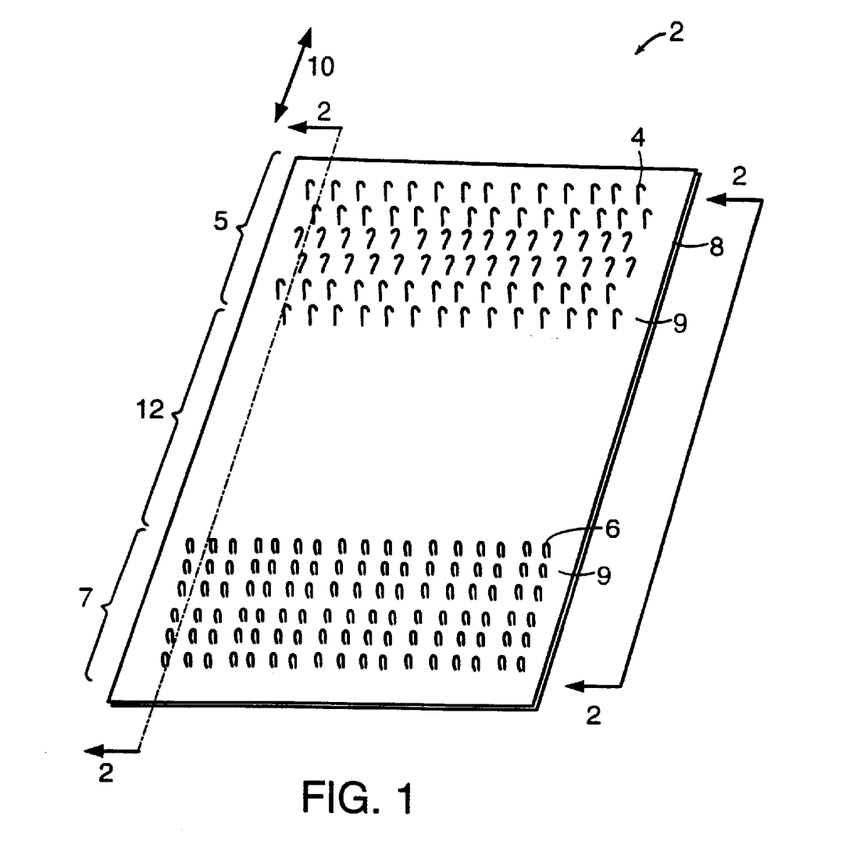
FIG. 1 is a diagrammatic view of a woven fastener product having separate hook fastener element and loop fastener element arrays.
Figure 2:
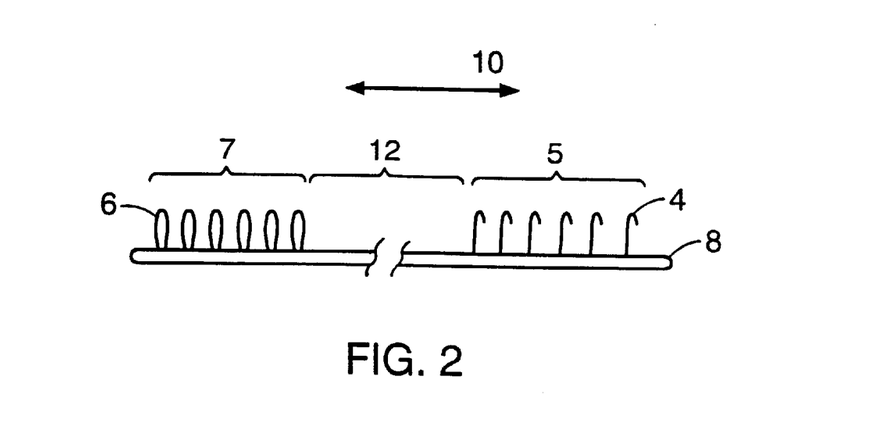
FIG. 2 is a cross-section of the woven fastener product of FIG. 1 in the warp direction taken along line 2—2.

The arrays of hook elements 4 and loop elements 6 include rows 9 of respective fastener elements that extend in the filling direction of the fabric base 8. Each row 9 has more than two fastener elements. For fastener products having a width of one inch, more typically each row includes more than eight fastener elements, and in some cases greater than fifteen fastener elements. As illustrated in the embodiment of FIG. 1, the rows 9 extend substantially across the width of the fastener product 2 while in other cases, the rows may extend for only a fraction of the width. Hook element regions 5 and loop element regions 7 have at least two rows 9, often greater than five rows, and in many cases greater than ten rows. The size and arrangement of the fastener element arrays, such as the number of rows and fastener elements per row, can thus be varied for different fastener applications. Respective rows 9 in the hook region 5 may have hook elements 6 oriented in opposite directions, as shown.

Typically, but not exclusively, hook elements 4 have heights in the range of 0.050 inches to 0.10 inches and the hook element array includes greater than 100 hook elements per square inch and, in some cases, greater than 500 hook elements per square inch. Generally, loop elements 16 have heights on the order of 0.050 inches to 0.150 inches. The density of the loop array can be up to five to twenty times greater than that of the hook array because, as described further below, loop elements are made from multi-filament yarns with each filament capable of forming a loop element, while hook elements are made from monofilament yarn.

The method of manufacturing the fastener product 2 does not place requirements on the heights of the hook elements 4 relative to the loop elements 6. For example the hook elements may be shorter than loop elements, taller than loop elements or the same size as the loop elements.

The thickness of the fabric base 8 is primarily determined by the load that the product must withstand in use. Typically, the fabric base 8 of the fastener product has a thickness between 0.012 inches and 0.10 inches, but in some cases, can have thicknesses up to 0.50 inches or even greater. For the purpose of this application, fastener products having a base greater than 0.030 inches and a tensile strength in the warp direction of at least 300 pounds per lineal inch of width are defined as fastener webbings. Fastener webbings are suitable for use in load-bearing applications and also can be used to enhance appearance and for handling purposes. Fastener products having thinner bases than 0.030 inches are defined as fastener tapes that are used in applications involving relatively light loading.

Figure 3:
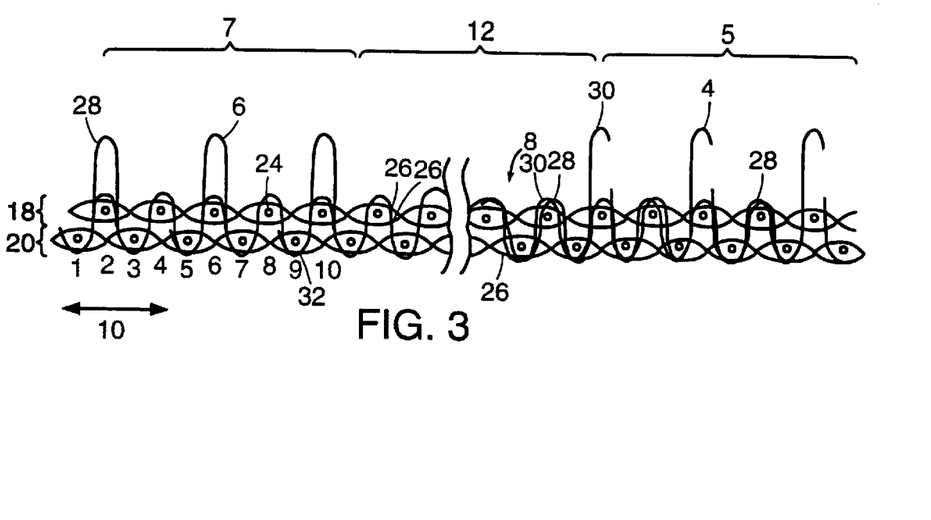
FIG. 3 is a cross-section in the warp direction of a portion of a woven fastener product having separate hook and loop arrays.
Figure 4:
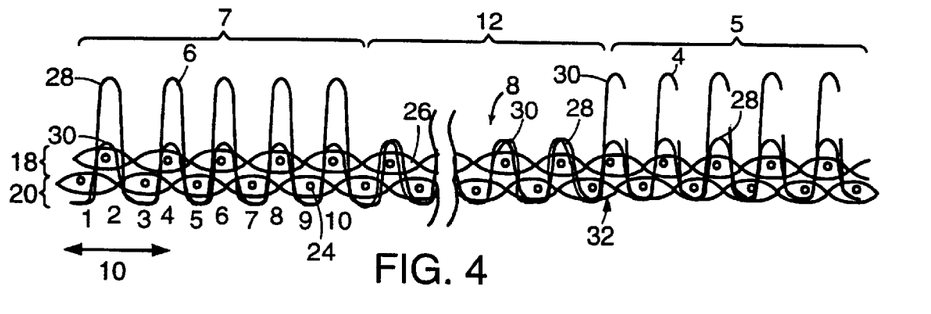
FIG. 4 is a cross-section in the warp direction of a portion of a woven fastener product having high density hook and loop arrays.
Figure 5:
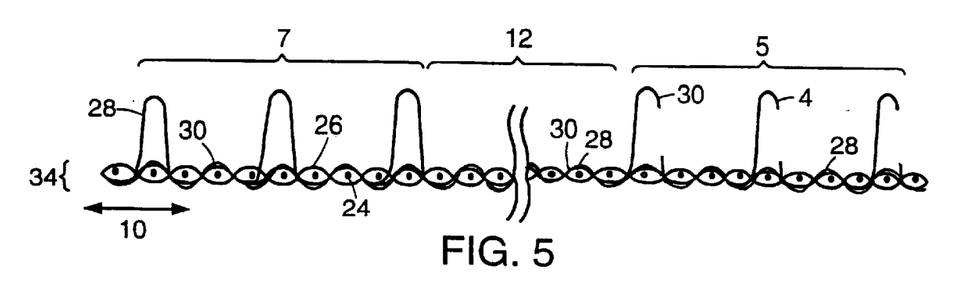
FIG. 5 is a cross-section in the warp direction of a portion of a woven fastener product having a single base fabric layer.

Referring to FIGS. 3–5, the fabric base 8 is made of an interlacing pattern of ground yarns. Ground yarns include warp yarns 26 that extend in the warp direction and filling yarns 24, illustrated by small circles, which extend in the filling direction. The small circles can represent a single filling yarn or, in other cases, may comprise a bundle of filling yarns. Examples of warp yarn and filling yarn, respectively, are multifilament Nylon-6 (280 deniers/14 filaments, 20 deniers per filament (dpf)) and multifilament Nylon-6 (100 deniers/34 filaments, 2.94 dpf). Other suitable yarns are made of Nylon 6.6 or PET. An adhesive yarn (250 deniers/1 filament) may also be included in a bundle of filling yarns that, as described further below, can be activated to secure the fastener elements to the base fabric.

The embodiments of FIGS. 3 and 4 have a first fabric layer 18 and a second fabric layer 20. In other embodiments (not shown), a third fabric layer is provided. To form the respective fabric layers 18, 20, warp yarns 26 pass above and below filling yarns 24 in the respective layers, in an alternating manner. The embodiment of FIG. 5 has a single fabric layer 34 in which the warp yarns 26 are interlaced with one row of filling yarns 24 to form the single layer structure.

Multi-filament yarns 28, shown schematically in FIGS. 3–5 by single lines, run in the warp direction continuously across the length of the fastener product. In loop element regions 7 of the fastener product, the multi-filament yarns 28 are used to form loop elements 6 by a well-known weaving technique. The technique involves passing the multi-filament yarns 28 over lancettes, which are wires selectively positioned above the surface of the base fabric 8 and extend in the warp direction. Multi-filament yarns 28 are thus interlaced between the lancettes and filling yarns 24 of the lower fabric layer 20. The lancettes are subsequently withdrawn to form loop elements that project from the surface of the base fabric 8.

Each individual filament of the multi-filament yarn 28 functions as a loop element 6 suitable for engagement by hook elements 4. In most cases, however, a hook element 4 engages multiple loop elements 6 that project from the same point of the base fabric 8.

In regions 5, 12, free of loop elements 6, the multi-filament yarns 28 are interlaced between consecutively numbered filling yarns 24 in the upper and lower fabric layers 18, 20 in the embodiments of FIGS. 3 and 4. The multi-filament yarns 28 function as ground yarns of the fabric base 8 that hold the two fabric layers together, in regions 5, 12, thus eliminating the need for a separate stitching yarn that performs this function.

Examples of multi-filament yarn suitable for making loop elements include Nylon-6 (200 deniers/10 filaments), Nylon-6 (280 deniers/14 filaments), Nylon 6.6 and PET.

Monofilament yarns 30 are also continuously interlaced between the filling yarns 24 of the upper and lower fabric layers 18, 20 during the weaving process. In the hook element region 5, lancettes are used, as described above, to form monofilament loops that project from the surface. The monofilament loops are heat set and cut, as described further below, to produce hook shape elements. In regions of the fastener product 7, 12, free of hook elements, the monofilament yarns 30 function as ground yarns that hold the upper and lower fabric layers 18, 20 together in the embodiments of FIGS. 3 and 4.

Monofilament yarns suitable for forming fastener elements typically have diameters in the range of 0.006 inches to 0.012 inches and are composed of polyester or nylon. For products that are exposed to water, polyester yarns are preferred because polyester does not absorb moisture that can sacrifice the performance of the closure.

Other types of fastener elements may be formed during weaving or in a postprocessing step, for example by melting the monofilaments with a hot wire to produce mushroom shaped fasteners.

In the embodiment of FIG. 3, hook elements 4 and loop elements 6 project from the surface of the base fabric 8 in their respective regions, every four filling yarns 24. As illustrated, loop elements 6 project over filling yarn number two, number six, and number ten. The embodiment of FIG. 4 has a higher density of fastener elements with hook elements 4 and loop elements 6 extending from the surface every two filling yarns in their respective regions. In this case, loop elements project over filling yarn number two, number four, and number six.

Fastener products having separate hook arrays and loop arrays are produced by cutting monofilament loop elements in the hook regions 5 without cutting multi-filament loop elements in the loop regions 7. One method of selectively cutting loops employs a cutting device moveable relative to the surface of the fastener product from a cutting position to a non-cutting position. To produce an array of hook elements 4, the cutting device is moved to the cutting position such that the cutting implements, for example reciprocating blades, shear the monofilament loops across the width of the array. An insignificant percentage of the loop elements may remain uncut in the hook element region 5 due to the cutting device occasionally not severing a small number of the loop elements. In the loop element region 7, to retain the multi-filament loops formed in the weaving process, the cutting device is moved away from the fastener product surface to a non-cutting position to prevent cutting the loop elements and to produce loop element arrays free of hook elements.

In an alternative method of manufacturing the fastener product having separate hook and loop arrays, the product moves relative to a fixed cutting device to selective cutting of the loop elements.

Hook elements 4 and loop elements 6 can be secured to fabric base 8 with a variety of techniques to prevent separation of the fastener elements from the base during use. In one case, a solvent or water-based mixture of a binder material, for example polyurethane or acrylic latex, is applied to a back surface 32 of fabric base 8 using a roller coater. The solution fully impregnates the fabric of base. A vaporization process, for example heating, evaporates the liquid component of the mixture and cures the binder material which anchors the bottom of the fastener elements to the fabric base 8.

In an implementation preferred in many cases, the binder material is a component in adhesive yarns which are incorporated into base fabric 8 as ground yarns (e.g. filling yarns or warp yarns) or bundles of ground yarns. In particular, using adhesive yarns is desirable in fastener webbings having relatively thick bases or two or more fabric layers (as depicted in FIGS. 3 and 4) due to the difficulty in fully impregnating the fabric base.

Adhesive yarns have a component that is activated to form a binder layer as by a heat treatment process or a solvent process. Heat-activated adhesive yarns include a low melting temperature component, for example, a polypropylene-based adhesive having a melting temperature between approximately 150° Celsius to 160° Celsius, or a low melting temperature Nylon having a melting temperature between approximately 80° Celsius to 180° Celsius. In certain preferred cases, the low melting temperature component may be a coating on a core material that has a higher melting temperature, for example Nylon-6 having a melt temperature between approximately 230° Celsius to 235° Celsius, or simply one of two or more yarn components. In other cases the adhesive yarn is made entirely of the low melting temperature constituent. In the heat treatment process, in either case, the fastener product is heated to a temperature and for a time period that melts the low-melting temperature constituent but does not melt warp yarns, filling yarns or the core material, if present. The melted constituent flows into intimate contact with the other yarns to form a matrix that anchors fastener elements to base.

Solvent-activated adhesive yarns have a binding material constituent that is readily dissolvable in a solvent, for example, a polyurethane-based material that dissolves in toluene or methyl ethyl ketone (MEK). The base is completely impregnated with the solvent to soften and cause the binding constituent to flow to again form a bonded matrix. The solvent is evaporated leaving the binding material in anchoring relationship with the bottom of fastener elements to fabric base.

Weaving techniques, themselves, may also be employed to secure fastener elements to fabric base. By using a tight weave for the fabric base, fastener elements are secured between adjacent warp yarns which provide enough force to prevent separation of the fastener elements from base during use. A tight weave is characterized by having a close fitting fabric construction which can be the result of several factors including employing a high density of warp and filling yarns per unit area of the base and/or employing a large diameter of warp and filling yarns.

Another weaving technique can be employed to secure the fastener hooks which involves securing fastener elements to the fabric base with the interlaces between fastener element yarn and filling yarns. The interlaces can act as anchoring points which prevent fastener elements from being pulled away from base during use. Typically, woven fastener products include one to five interlaces of fastener element yarn with warp yarns between consecutive fastener elements, which generally does not provide sufficient anchoring force. By increasing the number of interlaces between consecutive fastener elements to ten, for example, it is possible to adequately secure fastener elements to base.

Weaving techniques for anchoring fastener elements to the fabric base 8 may be used in combination with a binder material to reinforce the anchoring. In cases where fastener tape is frequently handled it may be advantageous to avoid coating the back surface 32 with a water or solvent-based binder material which, when cured, can give the tape a stiff or rough surface. Thus by using other methods, such as incorporating adhesive yarns into the fabric or the above-described weaving techniques, it is possible to create a product with a highly flexible and "kind" back surface. Using adhesive yarns has been shown to be particularly effective for the purposes of combining excellent securement of fastener elements with the desirable handling qualities mentioned above.

Figure 6:
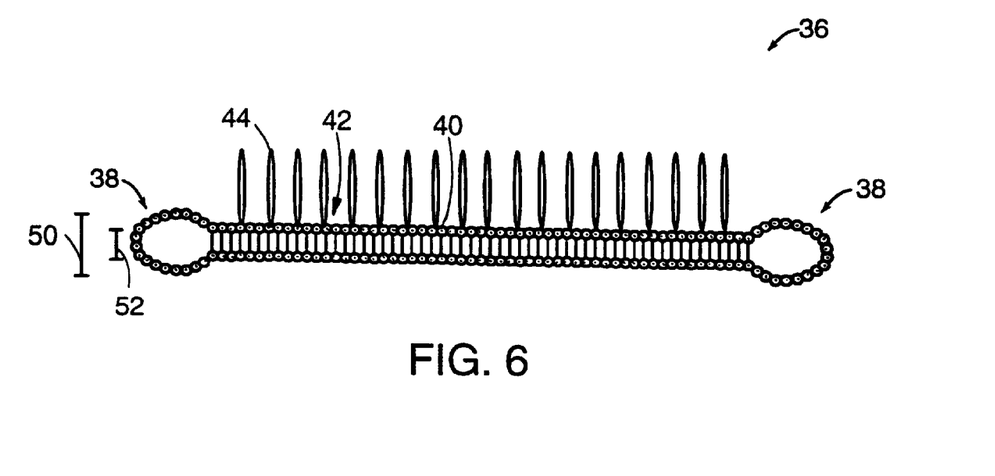
FIG. 6 is a cross-section in the filling direction of a woven fastener product that includes soft edges.
Figure 6A:
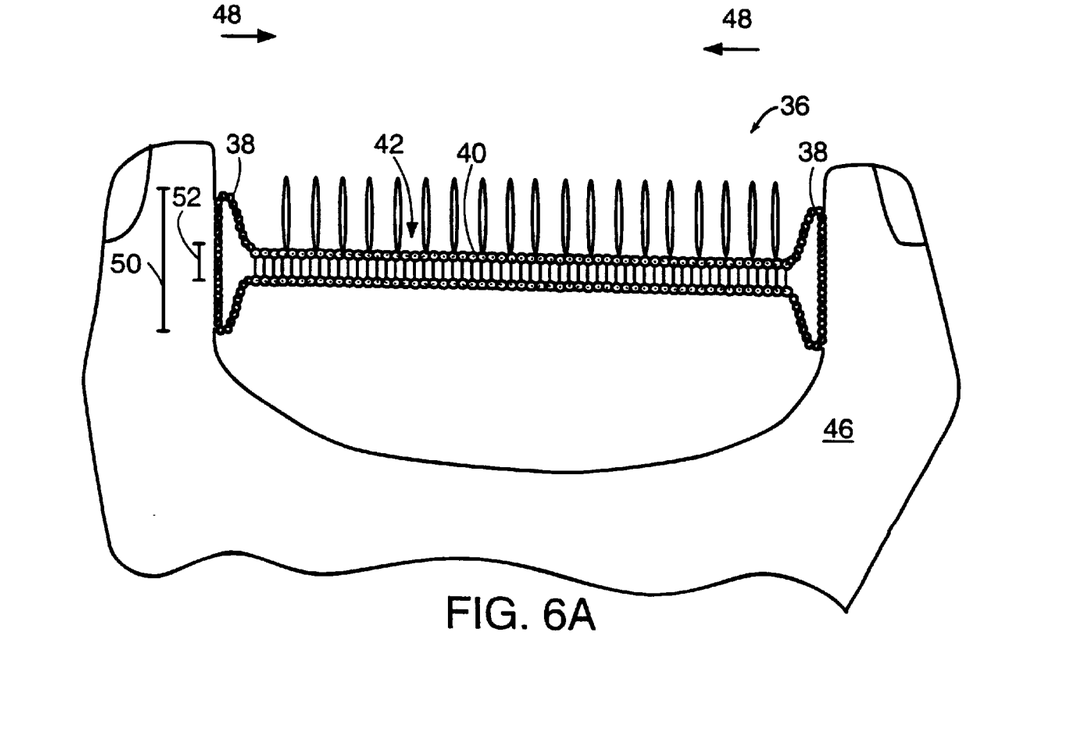
FIG. 6A schematically illustrates a hand applying a force to the edges of the woven fastener product of FIG. 6.

Referring to FIGS. 6 and 6A, in a particularly useful embodiment of the invention, a fastener product 36 has soft edges 38 that extend along warp direction sides of the product which dissipate applied forces to allow a user to comfortably touch the edges of the product. Fastener products with soft edges have been described in the pending application by one of the present inventors (application Ser. No. 09/050,501, filed Mar. 30, 1998, entitled "Woven Fastener Product"), the entire contents of which are incorporated herein by reference. Soft edges 38 are characterized by having a thicker cross-section than the main body 40 of the base fabric 42, from which fastener elements 44 project. In some cases, the soft edges are tube structures, as illustrated, or in other case the edges are formed by thicker yarns.

In the absence of a compressive force, the tube structure at each edge 38 is typically flat, having no internal member to define the tube shape. (FIG. 6) The tube structure has a thickness 50 at least greater than the thickness 52 of the main body 40. When a force is applied to each edge of a fastener product 36 by a hand 46 in the direction indicated by arrows 48, the tube structures are compressed in the direction of arrows, thus increasing thickness and the area of tube structure in contact with hand. (FIG. 6A) The thickness 50 of the compressed tube structure is significantly greater than the thickness 52 of the main body 40. The pressure felt by hand as it applies the force to edge is representative of the softness of the edge. (Pressure being equal to force divided by area.) The greater thickness over which force is applied, results in relatively low pressure and the edge having the tube structure feels softer than would an edge having the thickness of the main body.

Figure 7:
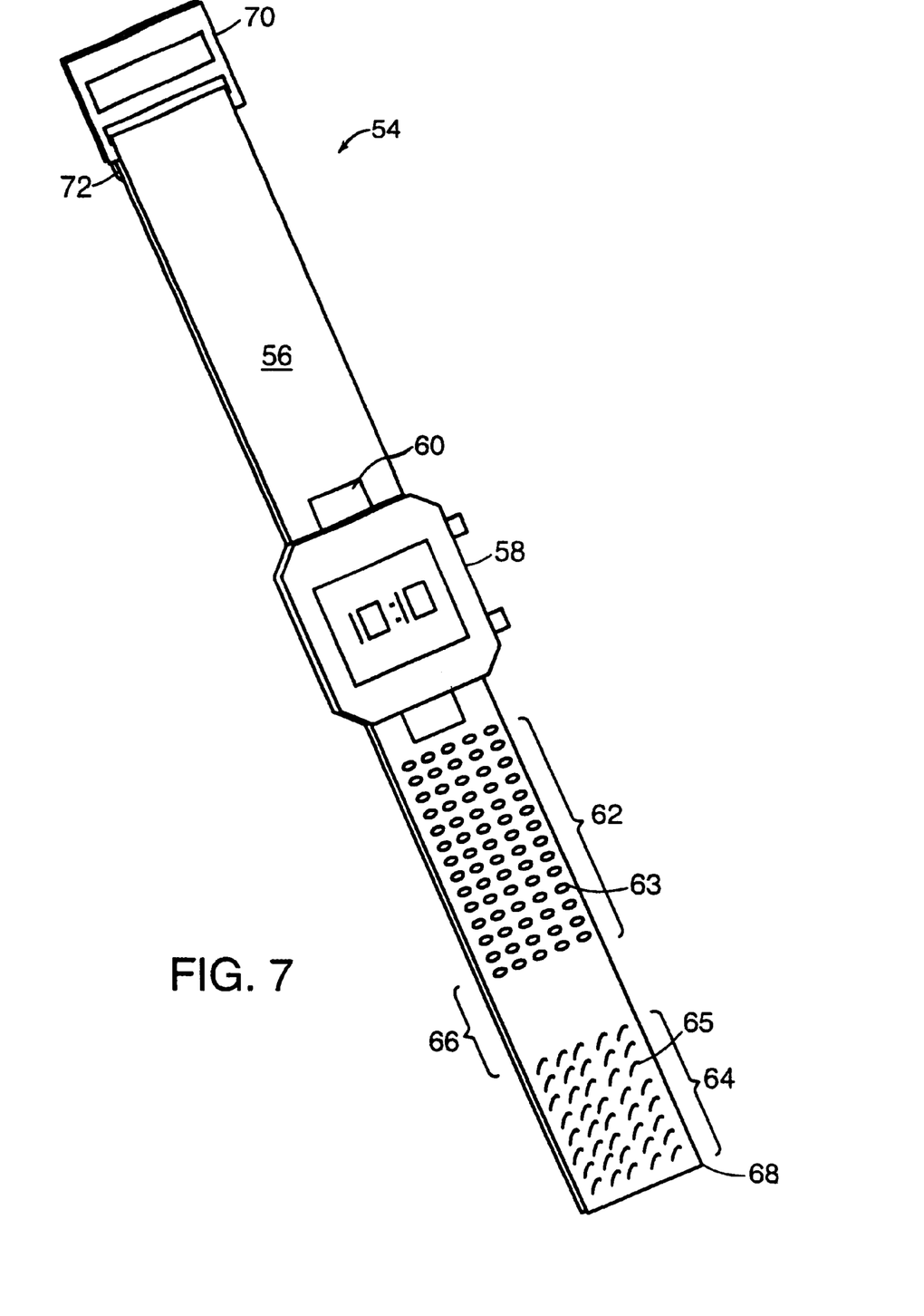
FIGS. 7 and 7A show the woven fastener product being used as a watch band.
Figure 7A:
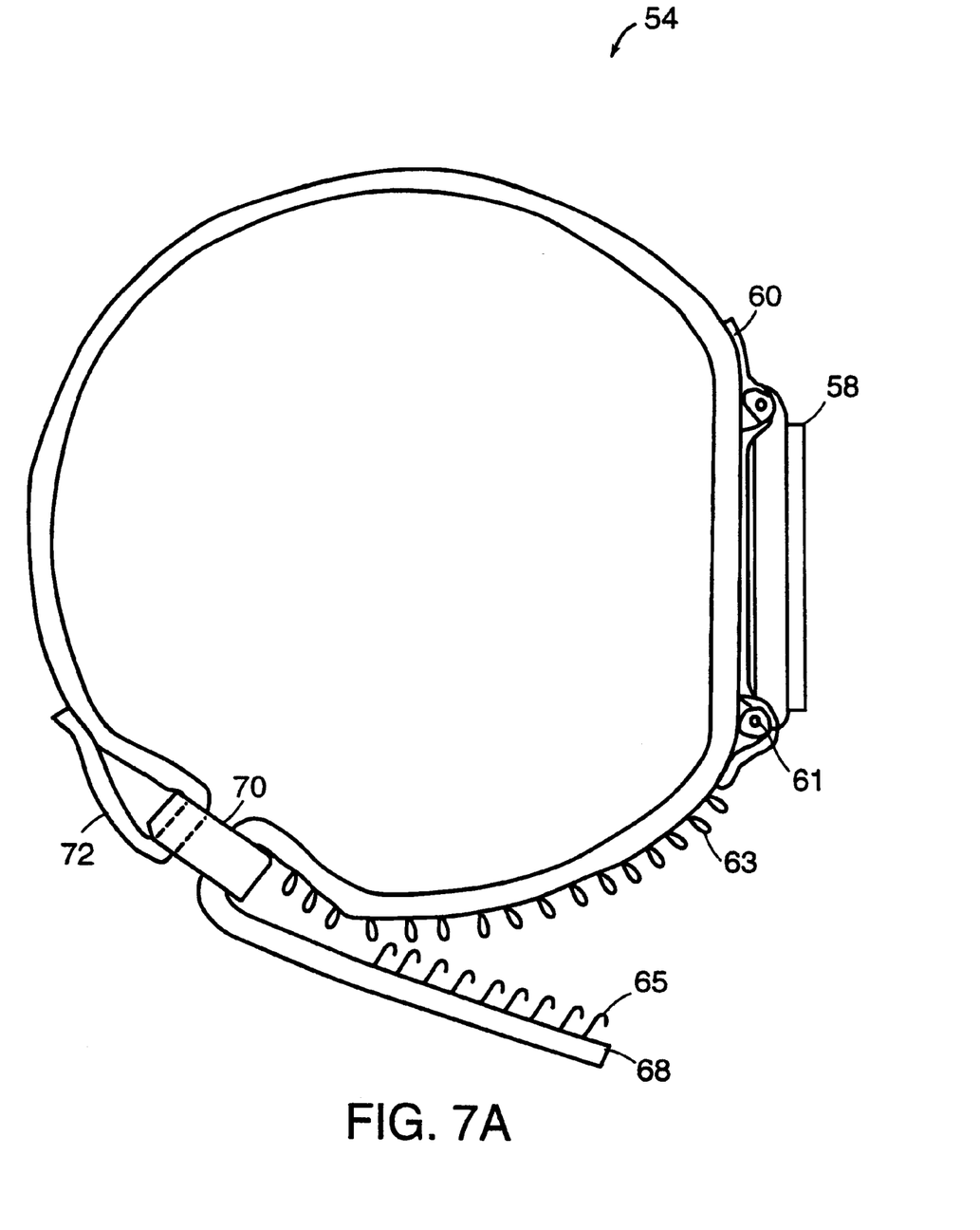

To illustrate one of the many examples of the woven fastener product in use, FIGS. 7 and 7A, show a watch 54 that includes a woven fastener webbing 56 that functions as a self-fastening watch band. A timepiece 58 is mounted on the woven fastener webbing 56 using an elastic ribbon 60 that is sewn to the fastener webbing and passes over pins 61 projecting from sides of the timepiece. The timepiece 58 is positioned adjacent an array 62 of loop elements 63 that extends for about 3.0 inches down the length of the webbing 56, in the warp direction, and is separated from an array 64 of hook elements 65 by a region 66 free of fastener elements. The hook element array 64 extends about 1.0 inch in the warp direction to a distal end 68 of fastener webbing 56. To secure the watch 54, the distal end 68 is passed through a buckle 70 attached to an opposite end 72 of the fastener webbing 56 and the fastener webbing is bent around the buckle to align the hook element array 64 with the loop element array 62. The hook elements 63 engage the loop elements 65 to fasten the watch around the wrist of a user. By adjusting the extent of the fastener webbing 56 pulled through the buckle 70, the watch can be conformed to fit different users.

Figure 8:
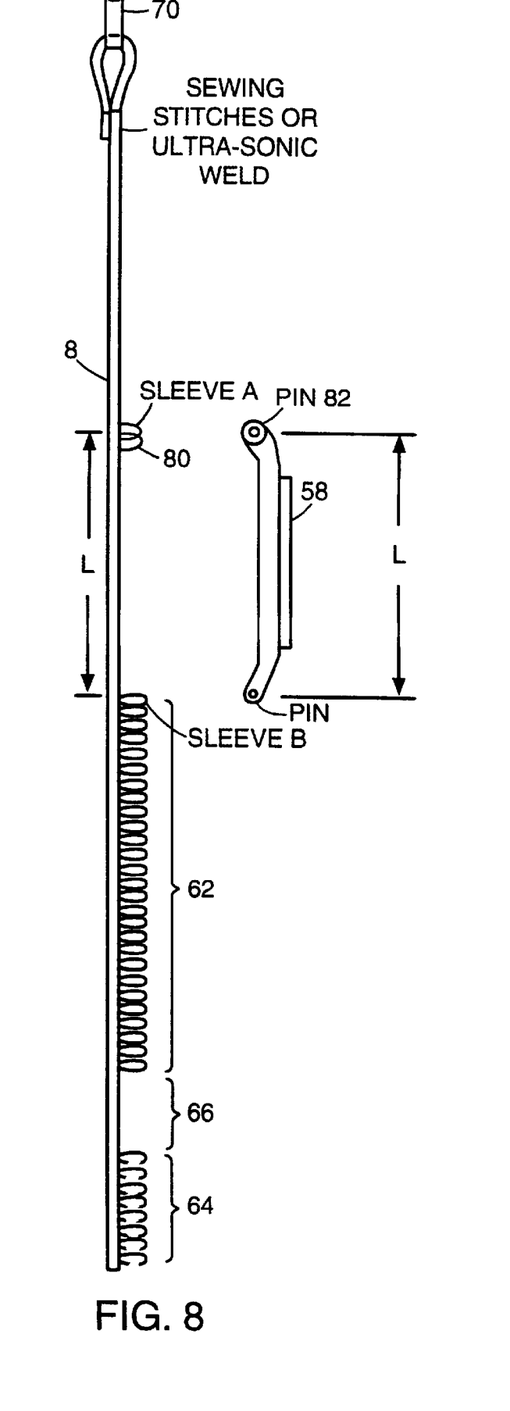
FIG. 8 is a side view which shows another embodiment of a woven fastener wrist band incorporating woven pin-receiving sleeves, for housing the pins of a watch.
Figure 8A:
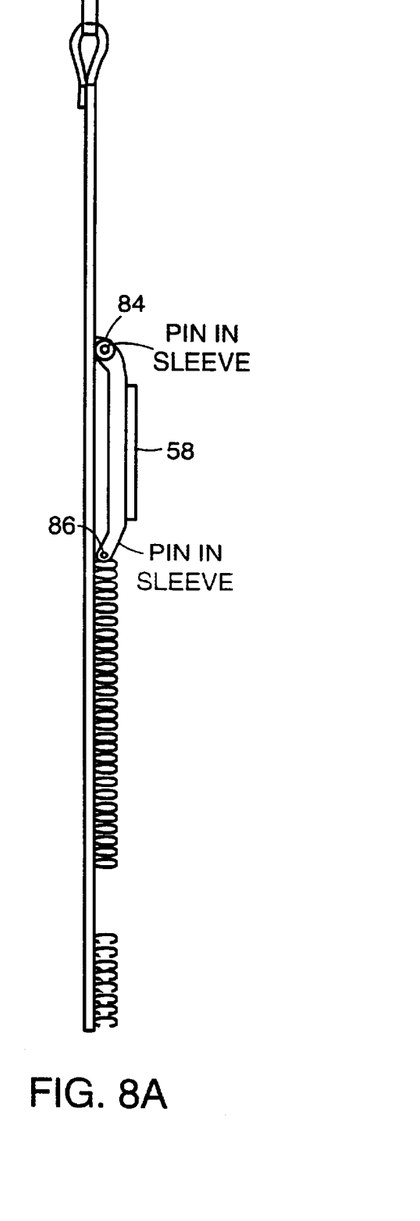
FIG. 8a is a similar view which shows the watch assembled on to the wrist band.
Figure 8B:
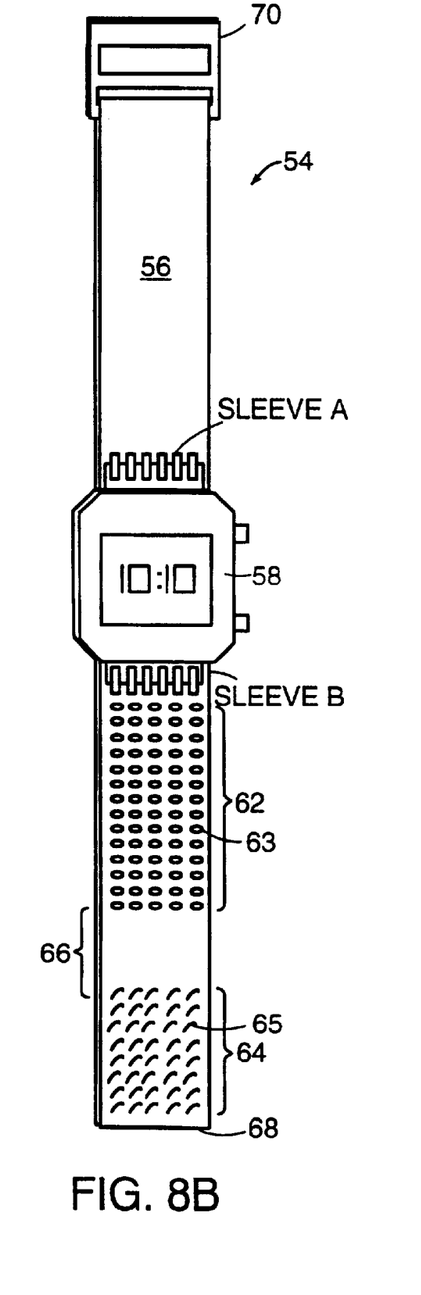
Figure 8C:
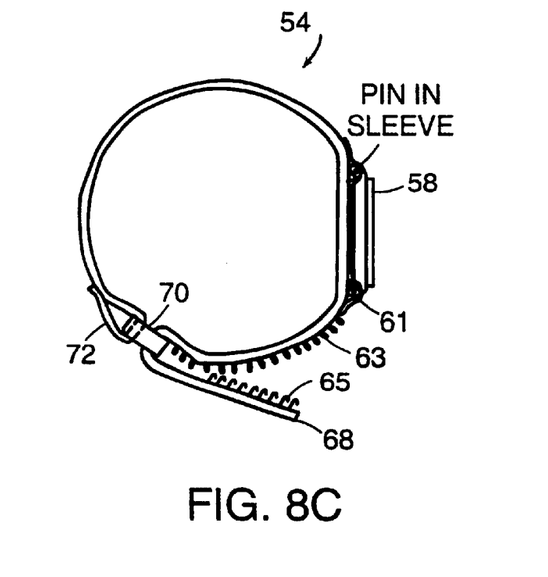
FIG. 8c is a view showing the band wrapped as it is when secured to a wrist.
Figure 8D:
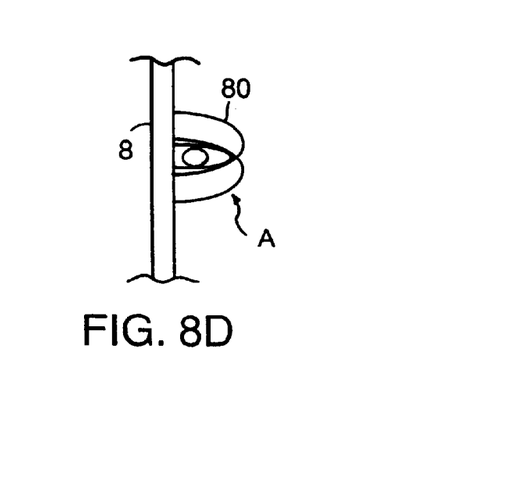
FIG. 8d is a magnified diagrammatic view of monofilament loops that cooperate to form a sleeve.

The embodiment of FIGS. 8–8c is similar to that of FIGS. 7 and 7a except that it combines a novel feature for securing the watch to the band. The feature comprises rows of monofilament loops 80 that are woven into the base webbing 8, to form pin-receiving sleeves. By weaving the band such that there is a sleeve "A" spaced apart a distance "L" from sleeve "B" that corresponds to the spacing "L" between pins of a watch or similar device, a mount is defined for a watch merely by the weaving of the band. The pins 82 are inserted in the sleeve and then in the retention holes 84 in the receiving ears 86 of the watch body to secure the watch to the band.

Portions of the same monofilaments that form hooks and the base can form such sleeves at strategic locations or additional or different monofilaments can be employed.

Figure 9:
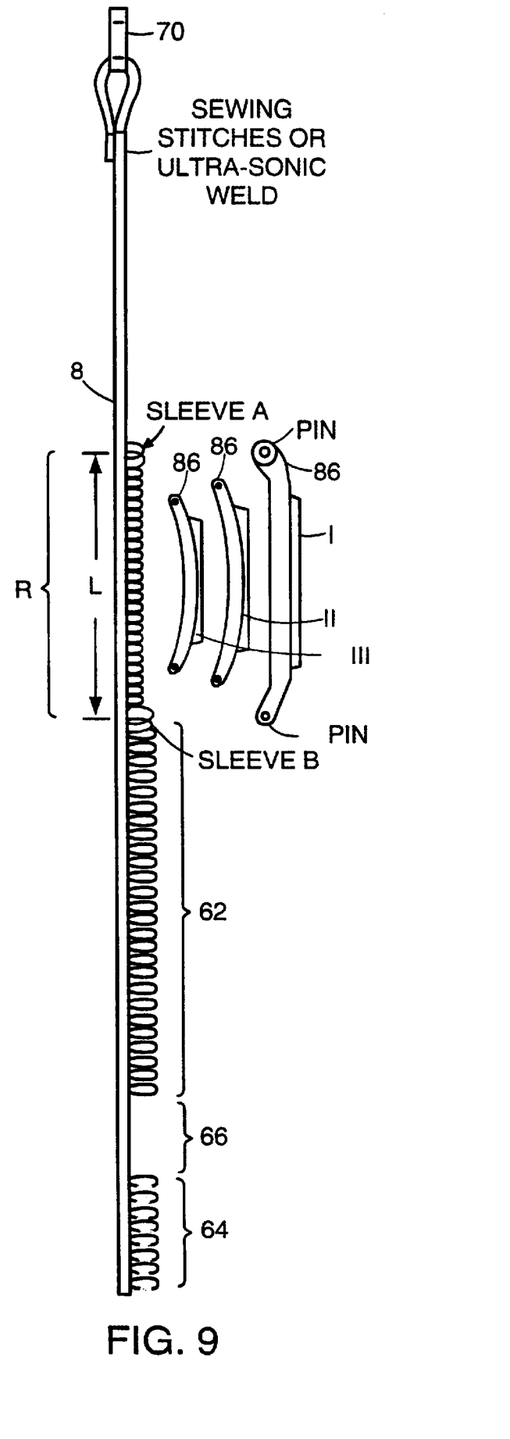
Figure 9A:
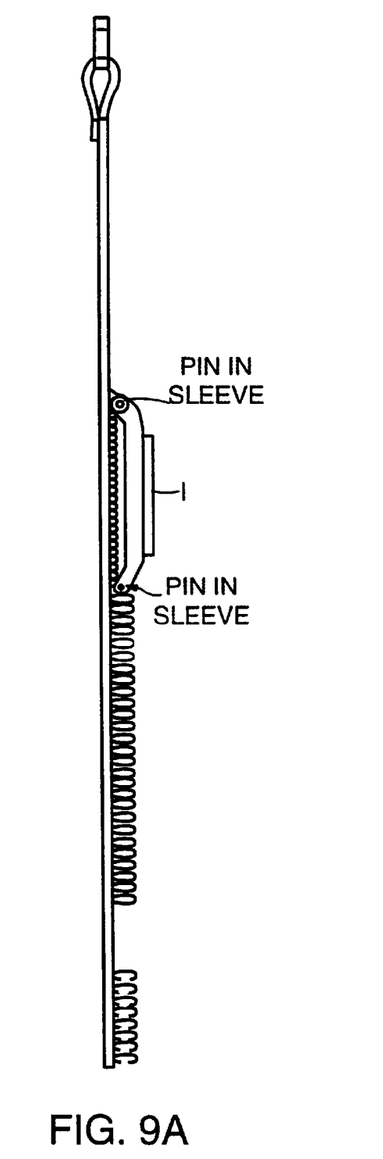
FIGS. 9A, 9b and 9C show, in solid lines, the band mounting a much smaller watch than that of FIG. 8, while phantom lines illustrate that other sizes can be received as well on the same type of band.
Figure 9B:
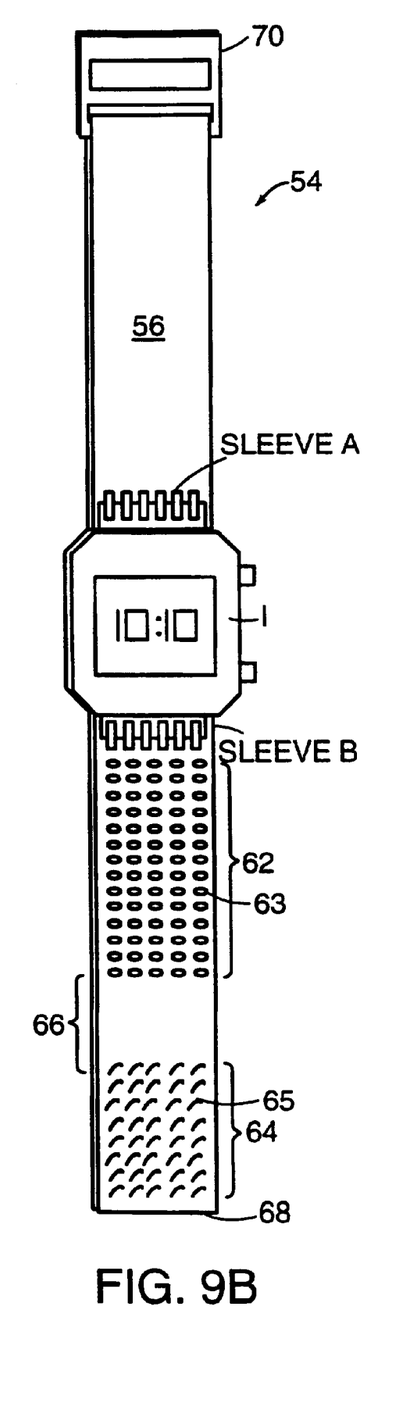
Figure 9C:
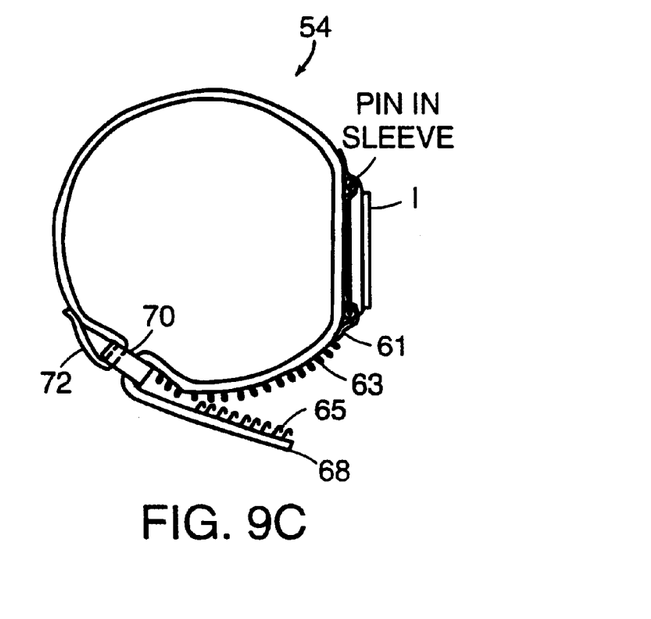
Figure 9D:
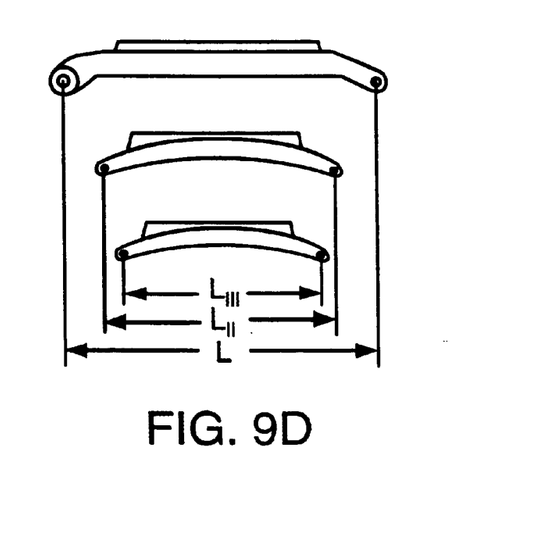
FIG. 9D diagrammatically illustrates three wristwatch bodies each of which can be mounted on the band of FIGS. 9–9C.

Referring now to FIGS. 9–9C, the drawings are similar to those of the series of FIG. 8 drawings except that the area between the pin-receiving loops 80 labeled "sleeve A" and "sleeve B", is filled with further rows "R" of such loop's. The resulting field of loops is receptive to various sizes of watches, as suggested in FIG. 9 by watches I, II and III. In each case, there are rows of loops in the field that correspond with the spacing of the mounting axes defined by the retention holes 84 of the receiving ears 86 of the respective watch bodies. These axes are spaced apart at different respective distances $I_I$, $I_{II}$, and $I_{III}$. Thus, one type of watchband so constructed can receive watches of different dimension. Likewise, bands of varying widths, suitable for different size watches, can be formed using the same loom set-up, in which only the width of the woven band may be changed.

In typical construction, the band may for instance be one inch in width and have thirteen monofilament warp yarns that form mounting loops, and preferably in another region loop-engaging hooks as well. The mounting loops can for instance be 0.074 inch in height suitable to fit conveniently under a typical watch that may, for instance, have curvature to a height of 0.120 inch at the peak of its arch over the band.

The inactive mounting sleeves between the active mounting sleeves, being resilient, provide a cushion for bedding the watch and add to the security of the mounting. The loops are formed in an alternating way according to a preferred weaving pattern such that loop arches of respective adjacent rows (that form respective mounting sleeves) overlap by ⅓ of their width.

Additional embodiments are within the scope of the following claims.

What is claimed is:

1. A method of manufacturing a woven fastener product including a fabric base having ground yarns comprising warp yarns and filling yarns extending respectively in warp and filling directions, comprising, in at least one selected functional region, forming at least some of the yarns into uncut loop elements aligned to define pin-receiving mounting sleeves.

2. The method of claim 1 in which the yarns forming the mounting sleeve are monofilaments.

3. The method of claim 1 in which the woven fastener product, in the warp direction, has a second functional region separated from the first functional region, the second functional region having an array including a plurality of rows of fastener elements, the fastener elements extending from a surface of the fabric base, the method comprising:

projecting monofilament yearns of the fabric base from the surface of the fabric base in selected locations in a first functional region to form an array of the loop elements;

projecting monofilament yarns of the fabric base from the surface of the fabric base in selected locations in the second functional region; and cutting the monofilament yarns projecting from the surface of the fabric base in the second functional region to form an array of loop-engaging fastener elements.

4. A method of manufacturing a woven fastener product including weaving warp monofilaments in a base, and at selected regions, forming at least some of the monofilaments in loops that are subsequently acted upon to form hooks, and in at least one other region of the fastener product forming at least some of the monofilaments into uncut loop elements aligned to define pin-receiving mounting sleeves.

5. The method of claim 1, 2, or 4 for use with a predetermined device having mounting pins spaced a pre-determined distance, including forming mounting sleeves in said product spaced apart said distance, to receive said pins of said pre-determined device.

6. The method of claim 1, 2, or 4 including forming a field of rows of said mounting sleeves suitable to receive mounting pins of a range of devices having respectively different spacing between pins.

* * * * *